US011039409B2

(12) United States Patent
Goyal et al.

(10) Patent No.: US 11,039,409 B2
(45) Date of Patent: Jun. 15, 2021

(54) NETWORK COORDINATION

(71) Applicant: QUALCOMM Incorporated, San Diego, CA (US)

(72) Inventors: Giriraj Goyal, Bangalore (IN); Vishal Agarwal, Ramnagar (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/234,427

(22) Filed: Dec. 27, 2018

(65) Prior Publication Data
US 2020/0213958 A1 Jul. 2, 2020

(51) Int. Cl.
*H04W 56/00* (2009.01)
*H04L 5/00* (2006.01)
*H04W 36/00* (2009.01)
*H04W 84/20* (2009.01)

(52) U.S. Cl.
CPC ......... *H04W 56/001* (2013.01); *H04L 5/0055* (2013.01); *H04W 36/0016* (2013.01); *H04W 84/20* (2013.01)

(58) Field of Classification Search
None
See application file for complete search history.

(56) References Cited

U.S. PATENT DOCUMENTS

| 6,570,857 | B1* | 5/2003 | Haartsen | H04W 74/06 370/312 |
| 2018/0084456 | A1* | 3/2018 | Gostev | H04W 84/18 |
| 2018/0352558 | A1 | 12/2018 | Paycher et al. | |
| 2020/0100029 | A1* | 3/2020 | Watson | H04W 4/50 |

OTHER PUBLICATIONS

International Search Report and Written Opinion—PCT/US2019/067176—ISA/EPO—dated Mar. 18, 2020.

* cited by examiner

*Primary Examiner* — Yaotang Wang
(74) *Attorney, Agent, or Firm* — Muncy, Geissler, Olds & Lowe, P.C.

(57) ABSTRACT

Systems and methods for network coordination are disclosed. A method comprises listening to a primary device during a receiving slot group of a primary/secondary (P/S) piconet shared between the primary device and the secondary device, determining based on the listening during the receiving slot group whether the primary device is attempting to communicate with the secondary device, listening to a host device on a host piconet during a transmitting slot group of the P/S piconet in response to a determination that the primary device is not attempting to communicate with the secondary device, and transmitting to the primary device over the P/S piconet during the transmitting slot group of the P/S piconet in response to a determination that the primary device is attempting to communicate with the secondary device.

30 Claims, 6 Drawing Sheets

NETWORK COORDINATION

INTRODUCTION

Aspects of this disclosure relate generally to wireless communication, and more particularly to network coordination and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long-Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

Wireless devices increasingly communicate by using multiple networks simultaneously. Moreover, they may compete with other devices to access the medium. For example, a host device may communicate with a first device in accordance with a first network (for example, a short-range network like Bluetooth) while simultaneously communicating with a second device in accordance with a second network (for example, a mid-range network like WiFi). Meanwhile, a third device may be communicating in accordance with a third network, interfering with efforts of the host device to communicate on the first network and/or the second network.

When multiple networks are used simultaneously, coexistence issues arise. For example, the host device may be forced to communicate in bursts on the first network in order to avoid interfering with the second network and/or the third network. As a result, latency and bandwidth usage associated with the first network may increase. These improvements may be of special importance for time-critical communications, for example, those using classic Bluetooth Basic Rate/Enhanced Data Rate (BR/EDR) for operating in accordance with streaming audio protocols like Bluetooth's Advanced Audio Distribution Profile (A2DP). New techniques are needed for improving latency and reducing bandwidth usage.

SUMMARY

The following summary is an overview provided solely to aid in the description of various aspects of the disclosure and is provided solely for illustration of the aspects and not limitation thereof.

In accordance with aspects of the disclosure, a method is disclosed. The method may comprise listening to a primary device during a receiving slot group of a primary/secondary (P/S) piconet shared between the primary device and the secondary device, determining based on the listening during the receiving slot group whether the primary device is attempting to communicate with the secondary device, listening to a host device on a host piconet during a transmitting slot group of the P/S piconet in response to a determination that the primary device is not attempting to communicate with the secondary device, and transmitting to the primary device over the P/S piconet during the transmitting slot group of the P/S piconet in response to a determination that the primary device is attempting to communicate with the secondary device.

In accordance with other aspects of the disclosure, an apparatus is disclosed. The apparatus may comprise a transceiver system, a memory system configured to store data, instructions, or a combination thereof, and a processing system coupled to the transceiver system and the memory system. The transceiver system may be configured to listen to a primary device during a receiving slot group of a primary/secondary (P/S) piconet shared between the primary device and a secondary device. The processing system may be configured to determine based on the listening during the receiving slot group whether the primary device is attempting to communicate with the secondary device. The transceiver system may be further configured to listen to a host device on a host piconet during a transmitting slot group of the P/S piconet in response to a determination that the primary device is not attempting to communicate with the secondary device, and transmit to the primary device over the P/S piconet during the transmitting slot group of the P/S piconet in response to a determination that the primary device is attempting to communicate with the secondary device.

In accordance with yet other aspects of the disclosure, another apparatus is disclosed. The apparatus may comprise means for listening to a primary device during a receiving slot group of a primary/secondary (P/S) piconet shared between the primary device and the secondary device, means for determining based on the listening during the receiving slot group whether the primary device is attempting to communicate with the secondary device, means for listening to a host device on a host piconet during a transmitting slot group of the P/S piconet in response to a determination that the primary device is not attempting to communicate with the secondary device, and means for transmitting to the primary device over the P/S piconet during the transmitting slot group of the P/S piconet in response to a determination that the primary device is attempting to communicate with the secondary device.

In accordance with yet other aspects of the disclosure, a non-transitory computer-readable medium is disclosed. The non-transitory computer-readable medium may comprise code for listening to a primary device during a receiving slot group of a primary/secondary (P/S) piconet shared between the primary device and the secondary device, code for determining based on the listening during the receiving slot group whether the primary device is attempting to communicate with the secondary device, code for listening to a host device on a host piconet during a transmitting slot group of the P/S piconet in response to a determination that the primary device is not attempting to communicate with the secondary device, and code for transmitting to the primary device over the P/S piconet during the transmitting slot group of the P/S piconet in response to a determination that the primary device is attempting to communicate with the secondary device.

In accordance with yet other aspects of the disclosure, another method is disclosed. The method may comprise listening to a host device during a receiving slot group of a host piconet, determining whether a secondary device synchronization condition is met, synchronizing with a secondary device over a P/S piconet in response to a determination that the secondary device synchronization condition is met, and listening to the host device during a subsequent receiving slot group of the host piconet in response to a determination that the synchronization condition is not met.

In accordance with yet other aspects of the disclosure, another apparatus is disclosed. The apparatus may comprise a transceiver system, a memory system configured to store data, instructions, or a combination thereof, and a processing system coupled to the transceiver system and the memory system. The transceiver system may be configured to listen to a host device during a receiving slot group of a host piconet. The processing system may be configured to determine whether a secondary device synchronization condition is met, and synchronize with a secondary device over a P/S piconet in response to a determination that the secondary device synchronization condition is met. The transceiver system may be further configured to listen to the host device during a subsequent receiving slot group of the host piconet in response to a determination that the synchronization condition is not met.

In accordance with yet other aspects of the disclosure, another apparatus is disclosed. The apparatus may comprise means for listening to a host device during a receiving slot group of a host piconet, means for determining whether a secondary device synchronization condition is met, means for synchronizing with a secondary device over a P/S piconet in response to a determination that the secondary device synchronization condition is met, and means for listening to the host device during a subsequent receiving slot group of the host piconet in response to a determination that the synchronization condition is not met.

In accordance with yet other aspects of the disclosure, another non-transitory computer-readable medium is disclosed. The non-transitory computer-readable medium may comprise code for listening to a host device during a receiving slot group of a host piconet, code for determining whether a secondary device synchronization condition is met, code for synchronizing with a secondary device over a P/S piconet in response to a determination that the secondary device synchronization condition is met, and code for listening to the host device during a subsequent receiving slot group of the host piconet in response to a determination that the synchronization condition is not met.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
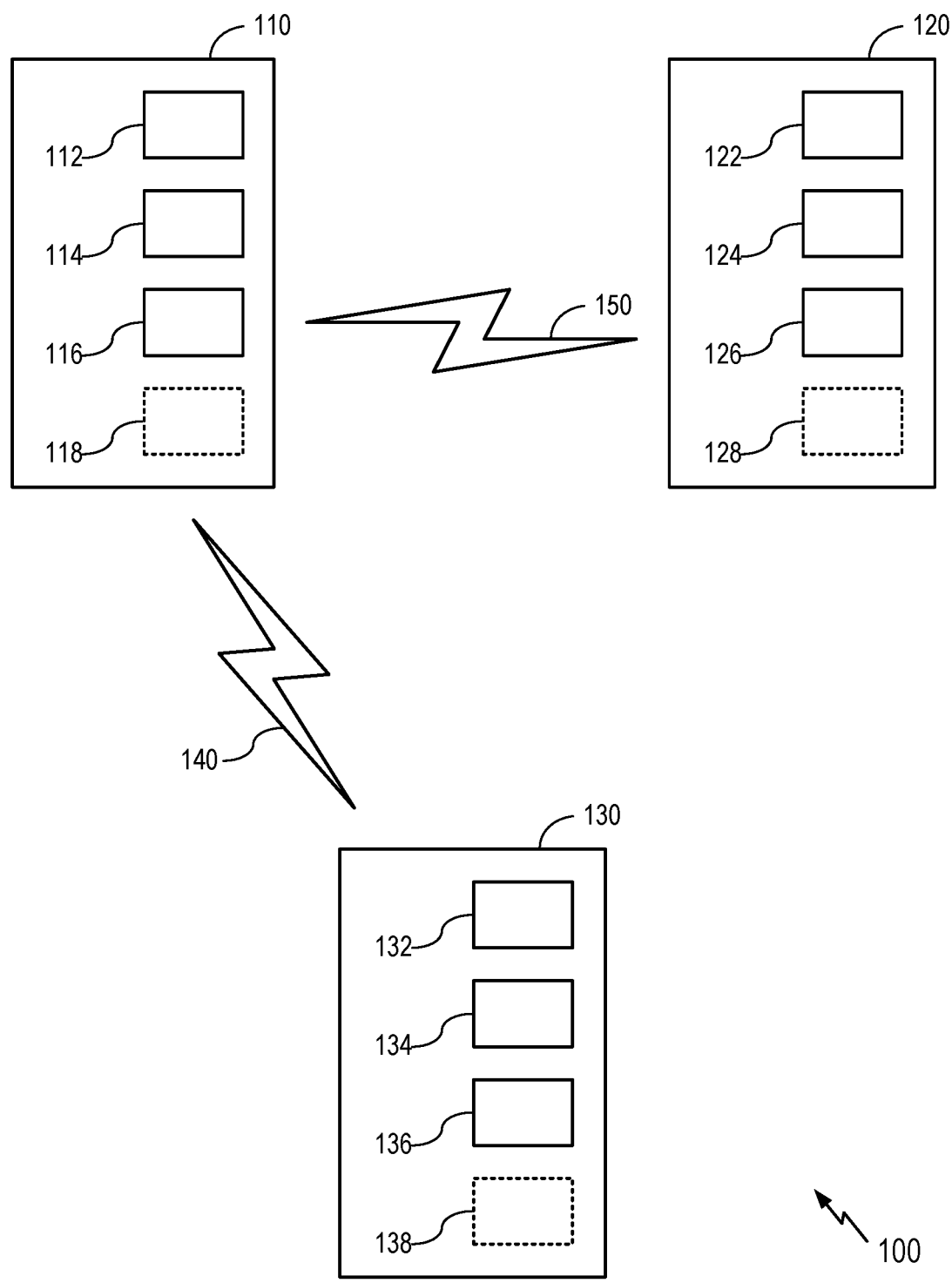
FIG. 1 generally illustrates a wireless environment that includes a primary device, a secondary device, and a host device.

FIG. 1 generally illustrates a wireless environment 100 that includes a primary device 110, a secondary device 120, and a host device 130. The primary device 110 and the host device 130 may establish a host piconet 140 to facilitate communication between the primary device 110 and the host device 130. In some implementations, the primary device 110 may be a master of the host piconet 140 (with the host device 130 as a slave), and in other implementations, the host device 130 may be the master of the host piconet 140 (with the primary device 110 as the slave). The host device 130 may be configured to transmit a series of data packets to the primary device 110 over the host piconet 140. If the primary device 110 receives a particular data packet, it may transmit an acknowledgement (ACK) to the host device 130. When the host device 130 receives the ACK, it may select a next data packet from the series for transmission. In this manner, the host device 130 may transmit each data packet in a series of data packets to the primary device 110. However, the host device 130 may also be obliged to coexist with other networks (not shown in FIG. 1). For example, the host device 130 may be required to observe a discontinuous transmission/reception scheme when communicating on the host piconet 140 in order to avoid undue interference with a nearby WiFi network. As a result, the primary device 110 may receive intermittent bursts of data packets from the host device 130. The bursts may arrive at unpredictable times, and may be punctuated by indefinite periods of reduced network activity.

The primary device 110 and the secondary device 120 may establish a primary/secondary (P/S) piconet 150 to facilitate communication within the wireless environment 100. It will be understood that there may be any number of secondary devices operating on the P/S piconet 150, but for brevity, the present disclosure will describe the behavior of a single secondary device, the secondary device 120. In some implementations, the primary device 110 may be a master of the P/S piconet 150 (with the secondary device 120 as a slave), and in other implementations, the secondary device 120 may be the master of the P/S piconet 150 (with the primary device 110 as the slave). In the present disclosure, communications between the primary device 110 and the secondary device 120 over the P/S piconet 150 may be broadly referred to as "synchronizations".

In one example of a synchronization, the primary device 110 may provide the secondary device 120 (over the P/S piconet 150) with host piconet configuration data relating to the host piconet 140. This host piconet configuration data may enable the secondary device 120 to 'eavesdrop' on the host piconet 140 without joining the host piconet 140 (sometimes referred to as "sniffing"). This may enable the secondary device 120 to receive one or more of the data packets that are transmitted from the host device 130 to the primary device 110. The host piconet configuration data may include a device address of a master of the host piconet 140 (i.e., the host device 130 or the primary device 110), a clock offset and a slot offset of the host piconet 140, a maximum packet size for communicating with the host device 130, a packet type table indicating a data rate of the host piconet 140, a channel map indicating frequencies used by the host piconet 140, a preferred data rate indicating an error coding scheme, a logical transport address of an asynchronous connection-oriented logical transport, synchronous connection-oriented logical transport, or enhanced synchronous connection-oriented logical transport between the host device and the primary device, any other suitable information, or any combination thereof. The secondary device 120, having been provided with the host piconet configuration data, may be enabled to determine a host piconet timing associated with the host piconet 140. For example, the host piconet configuration data may enable the secondary device 120 to identify transmissions from a master of the host piconet 140 and determine the host piconet timing based on the identified transmissions. Once the host piconet timing is determined, the secondary device 120 may be configured to listen to the host device 130 on the host piconet 140 in accordance with the determine host piconet timing.

As noted above, once the secondary device 120 is provided with the host piconet configuration data, the secondary device 120 may be capable of listening for data packets transmitted on the host piconet 140. However, it will be understood that the secondary device 120 may not send ACKs (a task which is left to the primary device 110). As a result, if the secondary device 120 misses a particular data packet, the host device 130 may proceed to the next without knowing that the secondary device 120 has missed the data packet.

Accordingly, the primary device 110 may be configured to synchronize with the secondary device 120 for the purpose of determining if any packets have been missed, identifying the missed packets (if there are any), and selectively relaying any missed data packets to the secondary device 120 (if necessary). Planned periodic synchronizations between the primary device 110 and the secondary device 120 may be complicated by the unpredictability of the bursts of data packets provided by the host device 130. The overall efficiency of the system depicted in FIG. 1 can be improved if the primary device 110 is configured to capture sudden bursts of data packets from the host device 130 while simultaneously meeting its obligations to the secondary device 120.

The primary device 110 may include a transceiver system 112, a memory system 114, a processing system 116, and optional other components 118. The transceiver system 112 may be configured to transmit and/or receive signals over the host piconet 140, the P/S piconet 150, and/or any other medium. The transceiver system 112 may be configured to operate in accordance with a Bluetooth protocol, a wireless land area network (WLAN) protocol, a wireless wide area network (WWAN) protocol, and/or any other suitable protocol. As an example, the transceiver system 112 may be configured to transmit and/or receive streaming audio data. The streaming audio data may be transmitted asynchronously using, for example, Bluetooth Basic Rate/Enhanced Data Rate (BR/EDR) protocol.

The memory system 114 may be configured to store data, instructions, or a combination thereof. The memory system 114 may comprise Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium. As used herein the term "non-transitory" does not exclude any physical storage medium or memory and particularly does not exclude dynamic memory (e.g., RAM) but rather excludes only the interpretation that the medium can be construed as a transitory propagating signal.

The processing system 116 may be coupled to the transceiver system 112, the memory system 114, and the other components 118. The processing system 116 may be configured to perform operations in accordance with the instructions stored in the memory system 114. The processing system 116 may be configured to transmit commands to the other components of the primary device 110. The commands may be transceiver commands associated with tuning to a particular frequency, transmitting and receiving in accordance with a particular timing, or transferring data to or from the transceiver system 112. Additionally or alternatively, the commands may be memory commands associated with storing and/or retrieving data and/or instructions.

The other components 118 may include one or more user inputs, one or more user output, a battery, and/or any other suitable components. In accordance with aspects of the disclosure, the other components 118 may include a speaker configured to transmit an audio signal. In particular, the speaker may be configured to receive an electronic signal from within the primary device 110 and convert the electronic signal into an audio signal.

The secondary device 120 may include a transceiver system 122, a memory system 124, a processing system 126, and optional other components 128. The transceiver system 122, the memory system 124, the processing system 126, and the other components 128 may be analogous to the transceiver system 112, the memory system 114, the processing system 116, and the other components 118 included in the primary device 110. For brevity, further description of these components will be omitted.

In some implementations, the primary device 110 and the secondary device 120 may collectively be provided as wireless earbuds. For example, the wireless earbuds may be configured to play, into the ears of a listener, stereo sound comprising left and right audio streams. The primary device 110 may transmit the left audio stream while the secondary device 120 transmits the right audio stream, or vice-versa.

The host device 130 may include a transceiver system 132, a memory system 134, a processing system 136, and optional other components 138. The transceiver system 132, the memory system 134, the processing system 136, and the other components 138 may be analogous to the transceiver system 112, the memory system 114, the processing system 116, and the other components 118 included in the primary device 110. For brevity, further description of these components will be omitted. The host device 130 may comprise a set top box, a music player, a video player, an entertainment unit, a navigation device, a personal digital assistant (PDA), a fixed location data unit, a computer, a laptop, a tablet, a communications device, a mobile phone, or any other suitable device.

Certain conditions in the wireless environment 100 may prevent consistent transmission and/or reception of the data. Accordingly, new techniques are required for improving transmission of host data in a wireless environment analogous to the wireless environment 100. As noted above, to minimize latency and bandwidth usage, new techniques may meet two requirements. First, whenever the host device 130 is transmitting to the primary device 110, the secondary device 120 should be listening to that communication. This enables the secondary device 120 to, for example, receive data packets transmitted from the host device 130 to the primary device 110. Second, whenever the primary device 110 elects to communicate with the secondary device 120, the secondary device 120 should be available and listening to the primary device 110. This enables the primary device 110 and the secondary device 120 to flexibly and opportunistically exchange control signaling and/or missed packets as necessary. In accordance with aspects of the disclosure, the secondary device 120 meets these two requirements by observing an alternating listening pattern in which it listens to the primary device 110 and the host device 130 in alternating slot groups, occasionally interrupting the alternating listening pattern to synchronize with the primary device 110. The alternating listening patterns will be as will be discussed in greater detail below, with reference to FIG. 3.

Figure 2A:
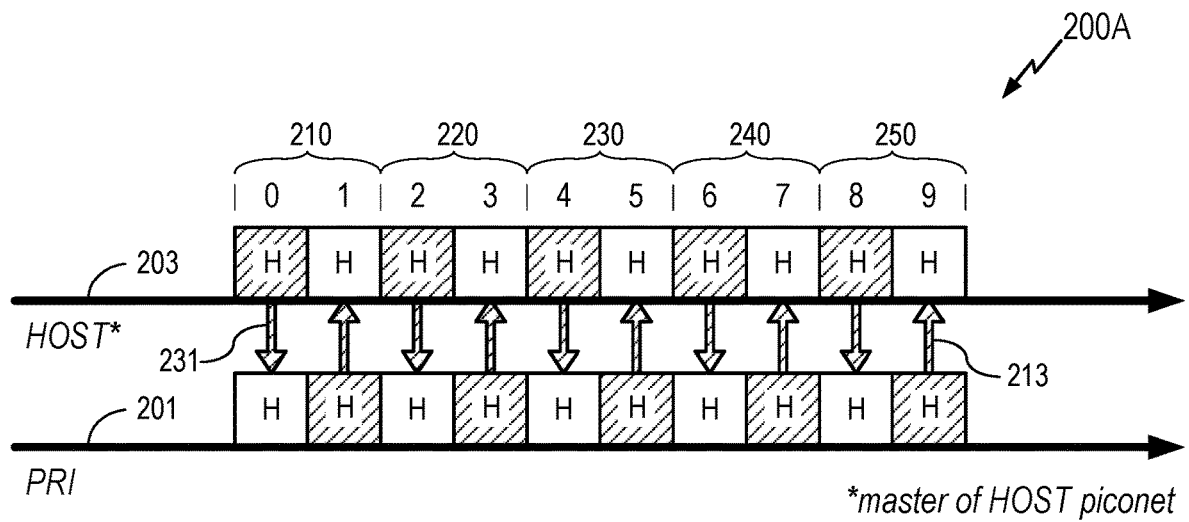
FIG. 2A generally illustrates a timing diagram of a host piconet shared by the host device and the primary device depicted in FIG. 1, in which the host device is master.
Figure 2B:
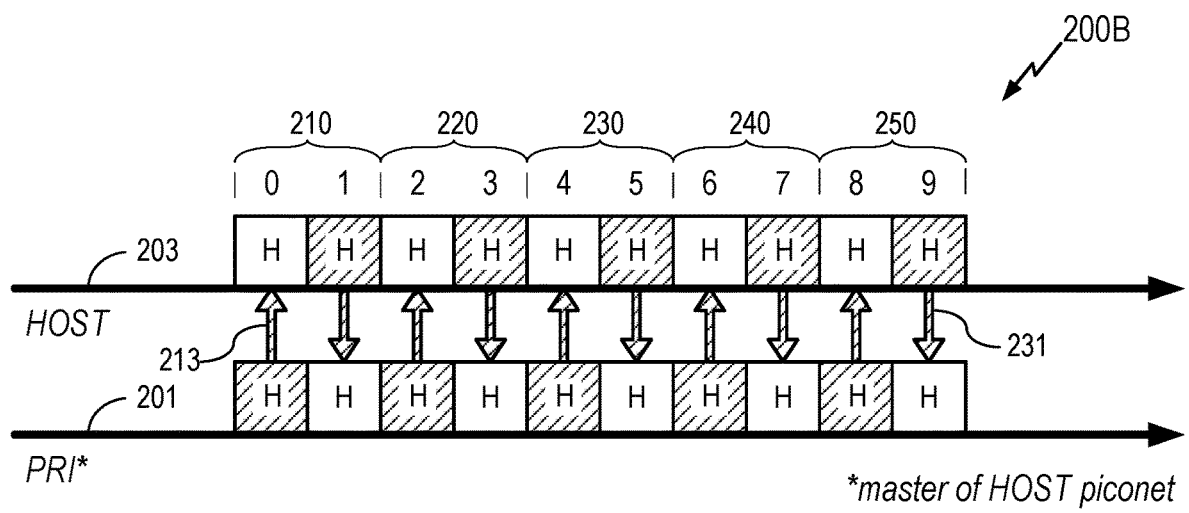
FIG. 2B generally illustrates a timing diagram of a host piconet shared by the host device and the primary device depicted in FIG. 1, in which the primary device is master.

FIGS. 2A-2B generally illustrate timing diagrams of the host piconet 140 shared by the host device 130 and the primary device 110. A piconet such as the host piconet 140 may have a master device and a slave device. In the scenario of FIG. 2A, the host device 130 is the master of the host piconet 140, whereas in FIG. 2B, the primary device 110 is the master of the host piconet 140. Although the following description is directed to the host piconet 140, it will be understood that other piconets described in the present disclosure (for example, the P/S piconet 150) may have similar features.

FIG. 2A generally illustrates a timing diagram 200A of the host piconet 140 shared by the host device 130 and the primary device 110 in which the host device 130 is master of a host piconet 140. The timing diagram 200A includes a host device timeline 203 and a primary device timeline 201. As will be discussed in greater detail below, the host piconet 140 may operate in accordance with a time-division duplexing (TDD) scheme in which a master device transmits for the duration of a particular group of consecutive time slots (hereinafter "slot group") while one or more slave devices receive. The roles may then reverse, such that in a subsequent slot group (for example, an immediately subsequent slot group), one of the one or more slave devices transmits while the master device receives. Each pair of consecutive slot groups, in which the master transmits and then the slave transmits, may be referred to as a "frame". In Bluetooth, for example, a single time slot may have a duration of six-hundred and twenty-five microseconds [625 µs], and a frame may have a duration of twelve-hundred and fifty microseconds [1250 µs]. A single slot group may occupy one, three, or five slots. Accordingly, a frame may occupy two, four, six, eight, or ten slots. For purposes of illustration, each slot group in the present example occupies one slot. However, it will be understood that the term slot group may refer to a duration that includes any suitable number of time slots.

The host device timeline 203 shows the transmission and reception pattern of the host device 130, whereas the primary device timeline 201 shows the transmission and reception pattern of the primary device 110. The host piconet 140 is established such that the slots of the TDD scheme (labeled '0' through '9' in FIG. 2A) are of uniform duration and alignment, known to both the host device 130 and the primary device 110. In the present example, each time slot corresponds to a single slot group, however this is merely an example since, as noted above, a slot group may include more than one slot.

The slots may be divided into pairs of consecutive slot groups (frames, as noted above). In the example of FIG. 2A, a first frame 210 includes a zeroth slot and a first slot (labeled '0' and '1'). Similarly, a second frame 220 includes slots '2' and '3', a third frame 230 includes slots '4' and '5', a fourth frame 240 includes slots '6' and '7', and a fifth frame 250 include slots '8' and '9'. Although only five frames are depicted in FIG. 2A, it will be understood that the transmission and reception pattern depicted in FIG. 2A may continue indefinitely.

As noted above, FIG. 2A depicts a scenario wherein the host device 130 is the master of the host piconet 140. As master, the host device 130 may have a host piconet transmission opportunity 231 in the first slot of each frame (each even-numbered slot in the present example). By contrast, the primary device 110 has an opportunity to transmit during a host piconet transmission opportunity 213 appearing in the last slot of each frame (each odd-numbered slot in the present example). Although only one of each is labeled in FIG. 2A, it will be understood that FIG. 2A depicts five instances of the host piconet transmission opportunity 231 and another five instances of the host piconet transmission opportunity 213.

FIG. 2B generally illustrates a timing diagram 200B of the host piconet 140 shared by the host device 130 and the primary device 110 in which the primary device 110 is master of the host piconet 140.

Like the timing diagram 200A, the timing diagram 200B depicts the host device timeline 203 and the primary device timeline 201. Moreover, the slots are labeled '0' through '9' and are grouped into five frames. Moreover, the host piconet transmission opportunity 213 is an opportunity for the primary device 110 to transmit to the host device 130 and the host piconet transmission opportunity 231 is an opportunity for the host device 130 to transmit to the primary device 110. However, by contrast to the scenario depicted in FIG. 2A, the primary device 110 is master of the host piconet 140. As a result, the host piconet transmission opportunity 213 (reserved for transmissions from the primary device 110 to the host device 130) occurs in the first slot of each frame (i.e., even-numbered slots in the present example) rather than the last slot of each frame (i.e., odd-numbered slots in the present example).

Although FIGS. 2A-2B are directed to example communications over the host piconet 140, it will be understood that a similar TDD scheme may be used for communications over the P/S piconet 150. In particular, a master of the P/S piconet 150 (which may be the primary device 110 or the secondary device 120) may transmit in a first slot group of a frame, and a slave may transmit in a second slot group of the frame.

Figure 3:
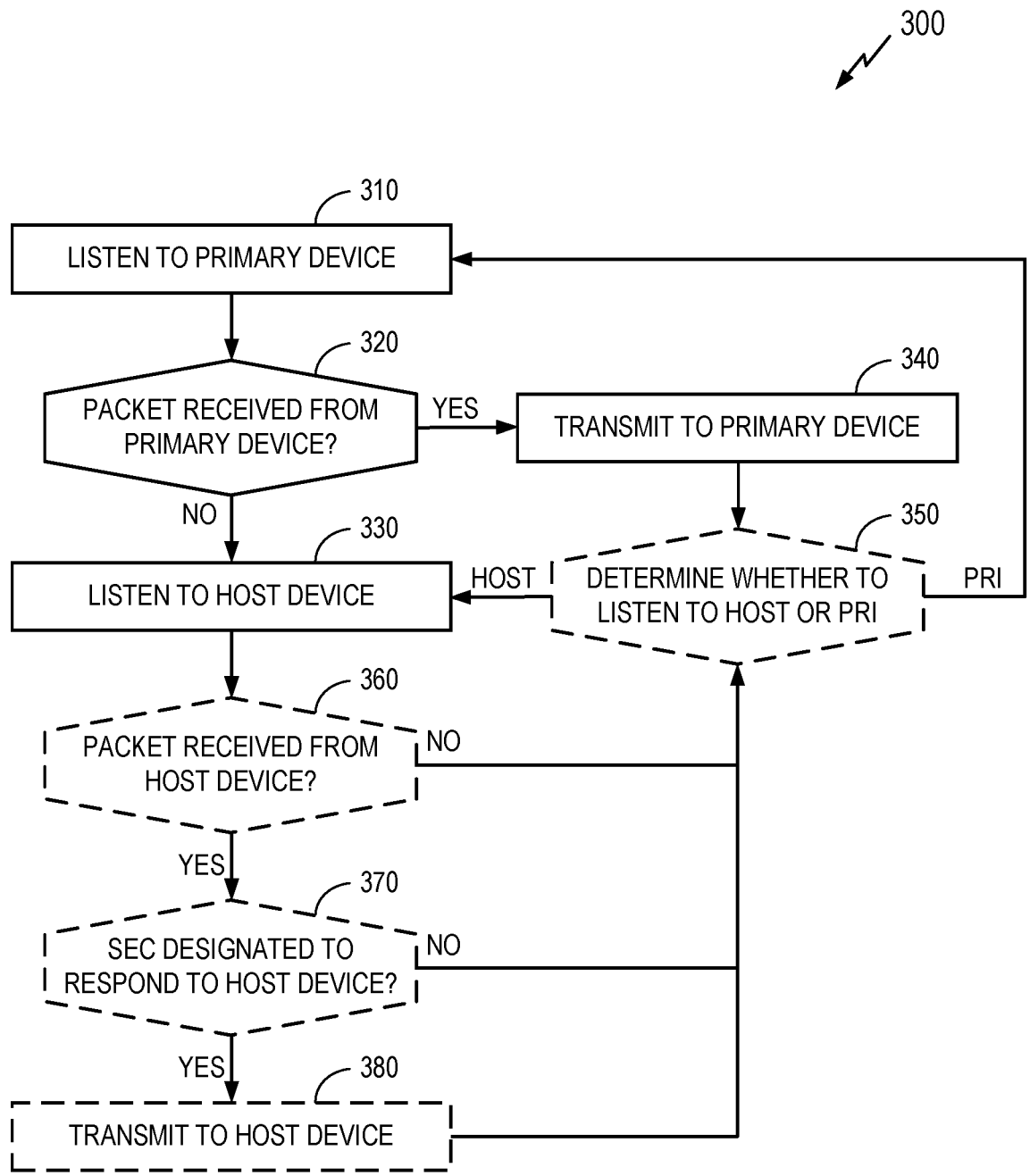
FIG. 3 generally illustrates a method performed by the secondary device depicted in FIG. 1.

FIG. 3 generally illustrates a method 300 performed by the secondary device 120. The method 300 depicted in FIG. 3 will be described as it would be performed by the secondary device 120 depicted in FIG. 1.

At 310, the secondary device 120 listens to the primary device 110 during a receiving slot group of the P/S piconet 150 shared between the primary device 110 and the secondary device 120. The listening at 310 may be performed by, for example, the transceiver system 122 depicted in FIG. 1. Accordingly, the transceiver system 122 may constitute means for listening to a primary device during a receiving slot group of a P/S piconet shared between the primary device and the secondary device. Moreover, the processing system 126 may be configured to operate the transceiver system 122 by executing code stored in the memory system 124. Accordingly, the memory system 124 may be a non-transitory computer-readable medium comprising code for listening to a primary device during a receiving slot group of a P/S piconet shared between the primary device and the secondary device.

As used herein, the term "receiving slot group" corresponds to the perspective of a particular device. For example, the listening at 310 is performed by the secondary device 120, therefore the "receiving slot group of the P/S piconet 150" corresponds to a slot group in the TDD scheme in which the secondary device 120 is configured to receive a data packet over the P/S piconet 150. If the secondary device 120 is a master of the P/S piconet 150, then the "receiving slot group" of the secondary device 120 is the first slot group of a frame, whereas if the secondary device 120 is a slave of the P/S piconet 150, then the "receiving slot group" of the secondary device 120 is the second slot group of the frame. This explanation is important because elsewhere in the field, the term "receiving slot group" may refer to the slot group in which the master of the P/S piconet 150 is configured to receive (i.e., always corresponding to the second slot group of a particular frame). Accordingly, it will be understood that in the method 300, the "receiving slot group" may be the first slot group of a particular frame or the second slot group of the particular frame, i.e., in whichever slot group the secondary device 120 is configured to receive over the P/S piconet 150, regardless of whether the secondary device 120 is a master or a slave of the P/S piconet 150.

At 320, the secondary device 120 determines based on the listening at 310 whether a packet is received from the primary device 110. If no packet is received at 310 ('no' at 320), then the method 300 proceeds to 330. If a packet is received at 310 ('yes' at 320), then the method 300 proceeds to 340. The determining at 320 may be performed by, for example, the memory system 124 and/or the processing system 126 depicted in FIG. 1. Accordingly, the memory system 124 and/or the processing system 126 may constitute means for determining based on the listening during the receiving slot group at 310 whether the primary device 110 is attempting to communicate with the secondary device 120. Moreover, the processing system 126 may be configured to perform the determining at 320 by executing code stored in the memory system 124. Accordingly, the memory system 124 may be a non-transitory computer-readable medium comprising code for determining based on the listening during the receiving slot group at 310 whether the primary device 110 is attempting to communicate with the secondary device 120.

At 330, the secondary device 120 listens to the host device 130 on the host piconet 140 during a transmitting slot group of the P/S piconet 150 in response to a determination at 320 that the primary device 110 is not attempting to communicate with the secondary device 120. The listening at 330 may enable the secondary device 120 to receive a data packet from the host device 130 (in the event that the host device 130 has transmitted a data packet). The listening at 330 may be performed by, for example, the transceiver system 122 depicted in FIG. 1. Accordingly, the transceiver system 122 may constitute means for listening to the host device 130 on the host piconet 140 during a transmitting slot group of the P/S piconet 150 in response to a determination at 320 that the primary device 110 is not attempting to communicate with the secondary device 120. Moreover, the processing system 126 may be configured to operate the transceiver system 122 by executing code stored in the memory system 124. Accordingly, the memory system 124 may be a non-transitory computer-readable medium comprising code for to the host device 130 on the host piconet 140 during a transmitting slot group of the P/S piconet 150 in response to a determination at 320 that the primary device 110 is not attempting to communicate with the secondary device 120.

As used herein, the term "transmitting slot group" is analogous to the term "receiving slot group" in that it corresponds to the perspective of a particular device. For example, the listening at 330 is performed by the secondary device 120, therefore the "transmitting slot group of the P/S piconet 150" corresponds to a slot group in the TDD scheme in which the secondary device 120 is configured to transmit a data packet over the P/S piconet 150. If the secondary device 120 is a master of the P/S piconet 150, then the "transmitting slot group" of the secondary device 120 is the first slot group of a frame, whereas if the secondary device 120 is a slave of the P/S piconet 150, then the "transmitting slot group" of the secondary device 120 is the second slot group of the frame.

At 340, the secondary device 120 transmits to the primary device 110 over the P/S piconet 150 during the transmitting slot group of the P/S piconet 150 in response to a determination at 320 that the primary device 110 is attempting to communicate with the secondary device 120. The transmitting at 340 may be performed by, for example, the transceiver system 122 depicted in FIG. 1. Accordingly, the transceiver system 122 may constitute means for transmitting to the primary device 110 over the P/S piconet 150 during the transmitting slot group of the P/S piconet 150 in response to a determination at 320 that the primary device 110 is attempting to communicate with the secondary device 120. Moreover, the processing system 126 may be configured to operate the transceiver system 122 by executing code stored in the memory system 124. Accordingly, the memory system 124 may be a non-transitory computer-readable medium comprising code for transmitting to the primary device 110 over the P/S piconet 150 during the transmitting slot group of the P/S piconet 150 in response to a determination at 320 that the primary device 110 is attempting to communicate with the secondary device 120.

At 350, the secondary device 120 optionally determines whether to listen to the host device 130 or the primary device 110. As will be discussed in greater detail below, the decision to listen to a particular device to may depend on a timing difference between the host piconet 140 and the P/S piconet 150, or any other suitable factor. If the secondary device 120 determines to listen to the host device 130 ('host' at 350), then the method 300 proceeds to the listening at 330, described above. If the secondary device 120 determines to listen to the primary device 110 ('pri' at 350), then the method 300 returns to the listening at 310, described above.

After listening at 330 to the host device 130, the secondary device 120 may optionally proceed to 360, 370, and 380. These optional blocks may correspond to a scenario in which the secondary device 120 is configured to occasionally, as needed, step into the shoes of the primary device 110. For example, as noted above, the primary device 110 is configured to transmit ACKs to the host device 130 every time a data packet is received. If the primary device 110 is low on battery, processing power, etc., it may determine that overall system efficiency and/or longevity is improved if secondary device 120 takes over responsibility for transmitting ACKs. The optional blocks at 360, 370, and 380, described below, correspond to a scenario in which the secondary device 120 is configured to take responsibility for such tasks.

At 360, the secondary device 120 determines whether a packet has been received from the host device 130. If a packet has been received from the host device 130 ('yes' at 360), then the method proceeds to 370. If a packet has not been received from the host device 130 ('no' at 360), then the method returns to the determining at 350.

At 370, the secondary device 120 determines whether the secondary device 120 is designated to respond to the host device 130. If the secondary device 120 is designated to respond to the host device 130 ('yes' at 370), then the method proceeds to 380. If the secondary device 120 is not designated to respond to the host device 130 ('no' at 370), then the method returns to the determining at 350. The determining at 370 may be based on designation information received from the primary device 110 over the P/S piconet 150. For example, if the designation information indicates that the secondary device 120 is designated to respond to the host device 130, then the secondary device 120 may determine at 370 that the secondary device 120 is designated to respond to the host device 130. If the designation information is not received, or the received designation information indicates that the secondary device 120 is not designated to respond to the host device 130, then the secondary device 120 may determine at 370 that the secondary device 120 is not designated to respond to the host device 130.

At 380, the secondary device 120 transmits to the host device 130. The transmitting at 380 may include, for example, transmitting of an ACK that acknowledges receipt of the data packet received from the host device 130 during the listening at 330.

It will be understood that performance of the method 300 depicted in FIG. 3 may result in the alternating listening pattern described above. In particular, the secondary device 120 may use a receiving slot group of the P/S piconet 150 to listen to the primary device 110, and then use an immediately subsequent transmitting slot group of the P/S piconet 150 to listen to the host device 130. This may continue indefinitely until a packet is received from the primary device 110 during a receiving slot group of the P/S piconet 150, indicating that there will be a synchronization (or at least an attempt to synchronize) between the primary device 110 and the secondary device 120 over the P/S piconet 150. In the event of a synchronization attempt, the secondary device 120 may temporarily abandon the alternating listening pattern and instead use the immediately subsequent transmitting slot of the P/S piconet 150 to provide a reply to the primary device 110.

In one example, a synchronization attempt may correspond to a process for selective relay of missed data packets. Accordingly, the synchronization may comprise transmitting to or receiving from the primary device 110 a selective relay information signal, wherein the selective relay information signal facilitates identification of one or more missed data packets that were transmitted by the host device and missed by the primary device 110 or the secondary device 120. Additionally or alternatively, the synchronization may comprise transmitting to or receiving from the primary device 110 (a) one or more missed data packets that were transmitted by the host device and missed by the primary device or the secondary device and/or (b) auxiliary information relating to the one or more missed data packets. Additionally or alternatively, the synchronization may comprise transmitting or receiving an ACK indicating that a packet has been received from the primary device 110 or a no-acknowledgement (NACK) indicating that the packet was received with errors. The selective relay may include any combination of the above, and may be carried out over a plurality of time slot groups. The plurality of time slot groups may be sequential, or alternatively, non-sequential, i.e., interrupted by an occasional return to the alternating listening pattern.

In another example, a synchronization attempt may correspond to a process for exchange of control data relating to one or more piconets. Accordingly, the synchronization may comprise receiving from the primary device updated host piconet configuration data facilitating continued listening to the host device. Additionally or alternatively, the synchronization may comprise transmitting to or receiving from the primary device updated P/S piconet configuration data facilitating continued communication over the P/S piconet. Additionally or alternatively, the synchronization may comprise transmitting to or receiving from the primary device handover information configured to enable the secondary device to switch from a master of the P/S piconet to a slave of the P/S piconet or vice-versa. Handover may comprise a mandatory step of switching the role of the primary device 110 and the secondary device 120. The switching may further result in a role switch for the master and the slave of the P/S piconet 150. The selective relay may include any combination of the above, and may be carried out over a plurality of time slot groups. The plurality of time slot groups may be sequential, or alternatively, non-sequential, i.e., interrupted by an occasional return to the alternating listening pattern.

Figure 4:
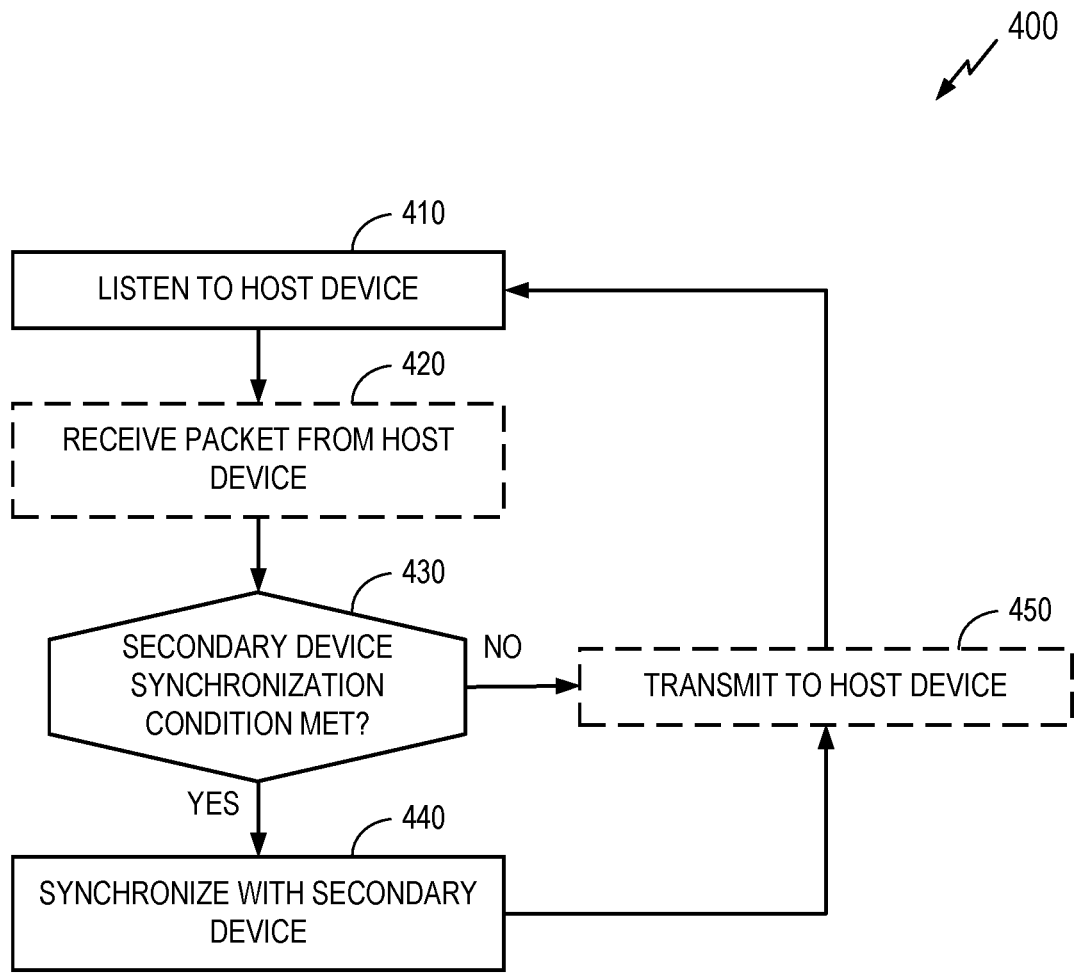
FIG. 4 generally illustrates a method performed by the primary device depicted in FIG. 1.

FIG. 4 generally illustrates a method 400 performed by the primary device 110. The method 400 depicted in FIG. 4 will be described as it would be performed by the primary device 110 depicted in FIG. 1. As noted above with respect to FIG. 3, the secondary device 120 may observe an alternating listening pattern until such time as the primary device 110 attempts to synchronize with the secondary device 120. The method 400 depicted in FIG. 4 relates to a decision by the primary device 110 as to whether to attempt to perform that synchronization.

At 410, the primary device 110 listens to the host device 130 during a receiving slot group of the host piconet 140. The listening at 410 may be performed by, for example, the transceiver system 112 depicted in FIG. 1. Accordingly, the transceiver system 112 may constitute means for listening to the host device 130 during a receiving slot group of the host piconet 140. Moreover, the processing system 116 may be configured to operate the transceiver system 112 by executing code stored in the memory system 114. Accordingly, the memory system 114 may be a non-transitory computer-readable medium comprising code for listening to the host device 130 during a receiving slot group of the host piconet 140.

At 420, the primary device 110 optionally receives a packet from the host device 130 during the listening at 410.

At 430, the primary device 110 determines whether a secondary device synchronization condition is met. If the secondary device synchronization condition is met ('yes' at 430), then the method proceeds to 440. If the secondary device synchronization condition is not met ('no' at 430), then the method proceeds to 450. Examples of the secondary device synchronization condition will be discussed in greater detail below. The determining at 430 may be performed by, for example, the memory system 114 and/or the processing system 116 depicted in FIG. 1. Accordingly, the memory system 114 and/or the processing system 116 may constitute means for determining whether a secondary device synchronization condition is met. Moreover, the processing system 116 may be configured to perform the determining at 430 by executing code stored in the memory system 114. Accordingly, the memory system 114 may be a non-transitory computer-readable medium comprising code for determining whether a secondary device synchronization condition is met.

At 440, the primary device 110 synchronizes with the secondary device 120. The synchronizing at 440 may be performed by, for example, the transceiver system 112, the memory system 114, and/or the processing system 116 depicted in FIG. 1. Accordingly, the transceiver system 112, the memory system 114, and/or the processing system 116 may constitute means for synchronizing with the secondary device 120. For example, the synchronizing may include transmitting or receiving communications using the transceiver system 112, retrieving any received communications from the transceiver system 112 using the memory system 114 and/or the processing system 116, and providing any transmitted communications to the transceiver system 112 using the memory system 114 and/or the processing system 116. Moreover, the processing system 116 may be configured to perform the synchronizing at 440 by executing code stored in the memory system 114. Accordingly, the memory system 114 may be a non-transitory computer-readable medium comprising code for synchronizing with the secondary device 120.

As noted above with respect to FIG. 3, a synchronization attempt may correspond to, for example, a process for selective relay of missed data packets and/or a process for exchange of control data relating to one or more piconets. For brevity, further description of these examples will be omitted.

At 450, the primary device 110 optionally transmits to the host device 130. The transmitting may comprise, for example, transmitting an ACK or NACK relating to a data packet that is received (or not received, or received with errors) during the listening at 410. The optional transmitting at 450 may be omitted if there is nothing to transmit. Moreover, the transmitting at 450 may also be omitted if the determining at 430 or the synchronizing at 440 completes at a time wherein the host device 130 is presently transmitting or (about to transmit) on the host piconet 140.

The secondary device synchronization condition that is the subject of the determining at 430 may be any condition that triggers a synchronization. As a first example, the secondary device synchronization condition may be a data packet reception condition relating to a number of data packets received from the host device 130, wherein the data packet reception condition is met if the number of data packets received from the host device 130 exceeds a data packet reception threshold. The number of data packets may be, for example, a number of data packets received since the last successful synchronization. Accordingly, having a large number of packets received since the last synchronization may indicate that the secondary device 120 is due for another synchronization.

As a second example, the secondary device synchronization condition may be a data readiness condition relating to whether a poll/null signal has been received from the host device, wherein the data readiness condition is met if the poll/null signal has been received. For example, the poll/null signal may be interpreted by the primary device 110 as an indicator that the host device 130 does not have further data at this time or is delaying further transmission of new packets for any suitable reason. Accordingly, the primary device 110 has an opportunity to synchronize with the secondary device 120 without necessarily missing any new packets from the host device 130.

As a third example, the secondary device synchronization condition may be a new control data condition relating to whether new control data has been generated or otherwise obtained by the primary device, wherein the new control data condition is met if new control data has been generated or otherwise obtained by the primary device. As noted above, the host piconet 140 may be established based on host piconet configuration data, and this host piconet configuration data is provided to the secondary device 120 by the primary device 110 so that the secondary device 120 can listen to the host device 130 on the host piconet 140. It will be understood that if the host piconet configuration data changes, it may be necessary for the primary device 110 to provide updated host piconet configuration data to the secondary device 120. Similarly, if a configuration of the P/S piconet 150 changes, it may be necessary for the primary device 110 to provide updated P/S piconet configuration data to the secondary device 120.

As a fourth example, the secondary device synchronization condition may be a handover request condition relating to whether the primary device seeks a handover to the secondary device or vice-versa, wherein the handover request condition is met if the primary device seeks the handover to the secondary device or vice-versa.

Figure 5:
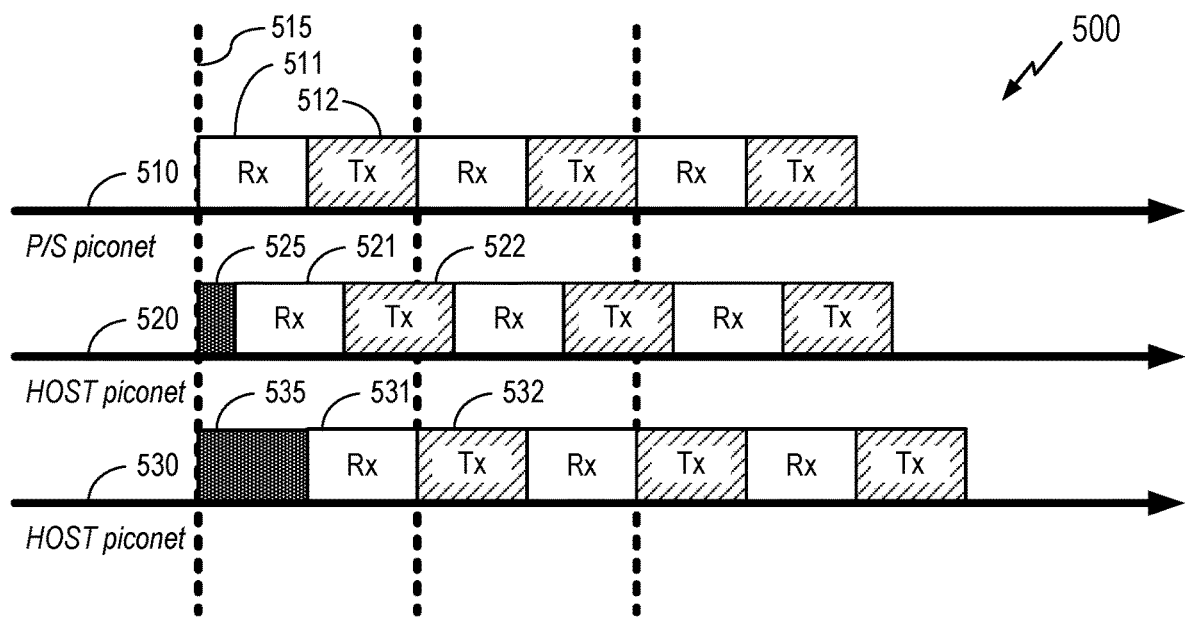
FIG. 5 generally illustrates a timing diagram for a first topology in which the primary device is a master of the P/S piconet and a slave of the host piconet.
Figure 6:
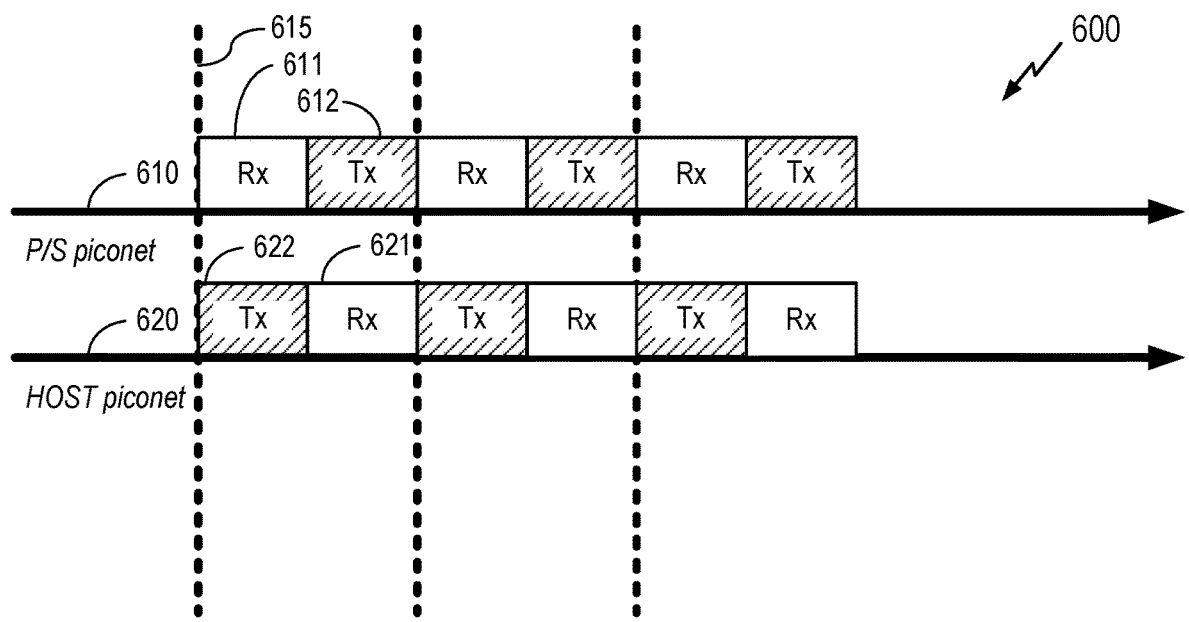
FIG. 6 generally illustrates a timing diagram for a second topology in which the primary device is master of both the P/S piconet and the host piconet.

FIGS. 5-8 depict various timing alignments relating to particular network topologies. FIGS. 5-6 relate to two topologies in which the primary device 110 is a master of the P/S piconet 150, whereas FIGS. 7-8 relate to two other topologies in which the secondary device 120 is the master of the P/S piconet 150.

Before proceeding to the details of FIGS. 5-8, a process for timing alignment will be described. As noted above, the primary device 110 and the host device 130 establish a host piconet 140 on which to communicate. The host piconet 140 has a particular host piconet timing that dictates which of the devices is transmitting and which of the devices is receiving at any given time. The master of the host piconet 140 may set, adjust, and/or maintain the host piconet timing. Adjustment and/or maintenance may be required if, for example, one or more of the clocks of the respective devices is keeping time imperfectly. Similarly, the P/S piconet 150 also has a particular P/S piconet timing that dictates which of the devices is transmitting and which of the devices is receiving at any given time. The master of the P/S piconet 150 may accordingly set, adjust, and/or maintain the P/S piconet timing.

It will be understood that for the method 300 and the method 400 to be performed successfully, the respective timings of the host piconet 140 and the P/S piconet 150 must be coordinated. In particular, when setting, adjusting, and/or maintaining the P/S piconet timing, the master of the P/S piconet 150 may calculate a slot-offset of the host piconet 140 with respect to the P/S piconet 150. The calculated slot-offset may correspond to a value or range of values. The corresponding value or range of values may differ for different topologies, as will be discussed in greater detail below.

FIG. 5 generally illustrates a timing diagram 500 for a first topology in which the primary device 110 is a master of the P/S piconet 150 and a slave of the host piconet 140. The timing diagram 500 shows, from the perspective of the secondary device 120, a relative alignment of the piconet timings of the host piconet 140 and the P/S piconet 150. In particular, the timing diagram 500 depicts a secondary device P/S piconet timeline 510, a secondary device host piconet timeline 520, and a secondary device host piconet timeline 530.

On the secondary device P/S piconet timeline 510, there is a receiving slot group 511 corresponding to a duration within the P/S piconet timing where the primary device 110 is transmitting on the P/S piconet 150. Elsewhere on the secondary device P/S piconet timeline 510 is a transmitting slot group 512 corresponding to a duration within the P/S piconet timing where the secondary device 120 is afforded an opportunity to transmit on the P/S piconet 150. Accordingly, each pair of slot groups (for example, the receiving slot group 511 and the transmitting slot group 512) may be separated from the next pair by a frame boundary 515. Because, in this scenario, the primary device 110 is a master of the P/S piconet 150, the first slot group in each frame is the receiving slot group 511 and the second slot group in each frame is the transmitting slot group 512. FIG. 5 depicts three frames, although it will be understood that the secondary device P/S piconet timeline 510 may continue in this manner indefinitely.

On the secondary device host piconet timeline 520, there is a receiving slot group 521 corresponding to a duration within the host piconet timing where the secondary device 120 is configured to listen to the host piconet 140, and potentially receive data from the host device 130. Elsewhere on the secondary device host piconet timeline 520 is a transmitting slot group 522 corresponding to a duration within the host piconet timing where the host device 130 is configured to listen to the host piconet 140. Because, in this scenario, the primary device 110 is a slave of the host piconet 140, the first slot group in each frame is the receiving slot group 521 and the second slot group in each frame is the transmitting slot group 522. As will be understood from the secondary device host piconet timeline 520, there is a minimum offset value 525 representing a minimum delay between the frame boundary 515 of the P/S piconet 150 and the beginning of the frame in the host piconet 140. The transmitting slot group 522 may be used by the secondary device 120 to transmit to the host device 130 if the primary device 110 has designated the secondary device 120 to do so. Otherwise, the transmitting slot group 522 may be used by the primary device 110 to respond to the secondary device 120 if it has received something from the host.

On the secondary device host piconet timeline 530, there is a receiving slot group 531 and a transmitting slot group 532 analogous to the receiving slot group 521 and the transmitting slot group 522 described above. As will be understood from the secondary device host piconet timeline 530, there is a maximum offset value 535 representing a maximum delay between the frame boundary 515 of the host piconet 140 and the beginning of the frame in the P/S piconet 150.

As noted above, in the scenario of FIG. 5, the primary device 110 is the master of the P/S piconet 150. Accordingly, the primary device 110 may be configured to calculate a slot-offset of the host piconet timing relative to the P/S piconet timing by selecting an offset value that is between the minimum offset value 525 depicted in FIG. 5 and the maximum offset value 535 depicted in FIG. 5. Once the slot-offset is calculated, the primary device 110 may be further configured to set, adjust, and/or maintain the P/S piconet timing based on the calculated slot-offset. In some implementations, the secondary device 120 (i.e., the slave of the P/S piconet 150) may simply follow the lead of the primary device 110. As a result, the secondary device 120 may observe a reception/transmission pattern on the host piconet 140 that begins later than the reception/transmission pattern depicted in the secondary device host piconet timeline 520 and earlier than the reception/transmission pattern depicted in the secondary device host piconet timeline 530 (i.e., between the minimum and maximum offsets).

The actual values of the minimum offset value 525 and the maximum offset value 535 may be calculated in any suitable manner For example, the minimum offset value 525 may be equal to (X+Y) and the maximum offset value 535 may be equal to a duration of a single frame plus Z minus Y, wherein X is an amount of time required for the secondary device 120 to determine whether the primary device 110 is attempting to communicate with the secondary device 120, Y is a time required by the secondary device secondary device 120 to switch between the host piconet 140 and the P/S piconet 150, and Z is a minimum residual time left after transmitting a full-length data packet. Z may correspond to three values $Z_1$, $Z_3$, and $Z_5$, where $Z_1$ corresponds to a one-slot length, $Z_3$ corresponds to a three-slot length, and $Z_5$ corresponds to a five-slot length. In the case of $Z_1$, the value may be equal, for example, to 625 µs minus an amount of time required to receive a packet with a maximum payload length of one slot. In the case of $Z_3$, the value may be equal, for example, to 1875 µs minus an amount of time required to receive a packet with a maximum payload length of three slots. In the case of $Z_5$, the value may be equal, for example, to 3125 µs minus an amount of time required to receive a packet with a maximum payload length of five slots. In general terms, for a packet with a slot length of N, Z may be equal, for example, to N times 625 µs minus an amount of time required to receive a packet with a maximum payload length of N slots. The host piconet 140 may be configured to use all of one-slot packets, three-slot packets and five-slots packet or any combination of these. Accordingly, Z may be equal to Minimum($Z_{N1}$, $Z_{N2}$, . . . ) µs, where N1, N2, . . . are the packet type lengths which the host piconet 140 is configured to use. So, Z may be equal to a minimum of time left from packet slot length after receiving the maximum payload length packet corresponding to the packet slot length from all the packet slot lengths for which the host piconet 140 is configured. This maximum offset will allow secondary device 120 to complete a reception from the host device 130 and listen to the primary device 110 in the immediate next slot. As will be understood from FIG. 5, the host piconet timeline 530 is shifted such that with maximum offset 535, the host device 130 finishes its reception by the start of the transmitting slot group 532 so that it can listen to the primary device 110 in the transmitting slot group 532 unless it is designated to respond to the host device 130 for a packet received in the receiving slot group 531. If so, the secondary device 120 will transmit to the host device 130 in the transmitting slot group 532.

FIG. 6 generally illustrates a timing diagram 600 for a second topology in which the primary device 110 is master of both the P/S piconet 150 and the host piconet 140. In this scenario, the host piconet 140 and the P/S piconet 150 may be described as aligned, wherein the primary device 110 need not set or adjust anything to bring this alignment, since the two piconets may act as a single piconet. Like the timing diagram 500, the timing diagram 600 shows a relative alignment of the piconet timings of the host piconet 140 with respect to the P/S piconet 150 from the perspective of the secondary device 120. The timing diagram 600 includes a secondary device P/S piconet timeline 610 analogous to the secondary device P/S piconet timeline 510 and a secondary device P/S piconet timeline 620 analogous to the secondary device host piconet timeline 520. Moreover, the secondary device host piconet timeline 610 includes a receiving slot group 611 analogous to the receiving slot group 511, a transmitting slot group 612 analogous to the transmitting slot group 512, and a frame boundary 615 analogous to the frame boundary 515.

In FIG. 6, the receiving slot group 611 and the transmitting slot group 622 correspond to a transmission slot of the primary device 110, and a reception slot of both the secondary device 120 and the host device 130. The primary device 110 may send a packet to either device based on, for example, the method 400 depicted in FIG. 4. If the primary device 110 transmits a packet to the host device 130, then the host device 130 will respond back in the receiving slot group 621. And since the secondary device 120 did not hear anything from the primary device 110 in receiving slot group 611, it will sniff to the host device 130 in the transmitting slot group 612. If the primary device 110 transmits a packet to the secondary device 120 in the receiving slot group 611, then the secondary device 120 will respond back in the transmitting slot group 612.

The secondary device P/S piconet timeline 620 includes a receiving slot group 621 analogous to the receiving slot group 521 and a transmitting slot group 622 analogous to the transmitting slot group 522, however, in the scenario of FIG. 6 (in which the primary device 110 is a master rather than a slave of the host piconet 140) the transmitting slot group 622 precedes the receiving slot group 621 within the frame.

As will be understood from FIG. 6, there is no offset of the host piconet timing relative to the P/S piconet timing. Accordingly, the primary device 110 may be configured to calculate a slot-offset equal to zero in response to a determination that the primary device 110 is the master of both the host piconet 140 and the P/S piconet 150. Once the slot-offset is calculated, the primary device 110 may be further configured to set, adjust, and/or maintain the P/S piconet timing based on the calculated slot-offset. In some implementations, the secondary device 120 (i.e., the slave of the the P/S piconet 150) may simply follow the lead of the primary device 110. As a result, the secondary device 120 may observe the reception/transmission pattern depicted on the secondary device host piconet timeline 620 of FIG. 6.

Figure 7:
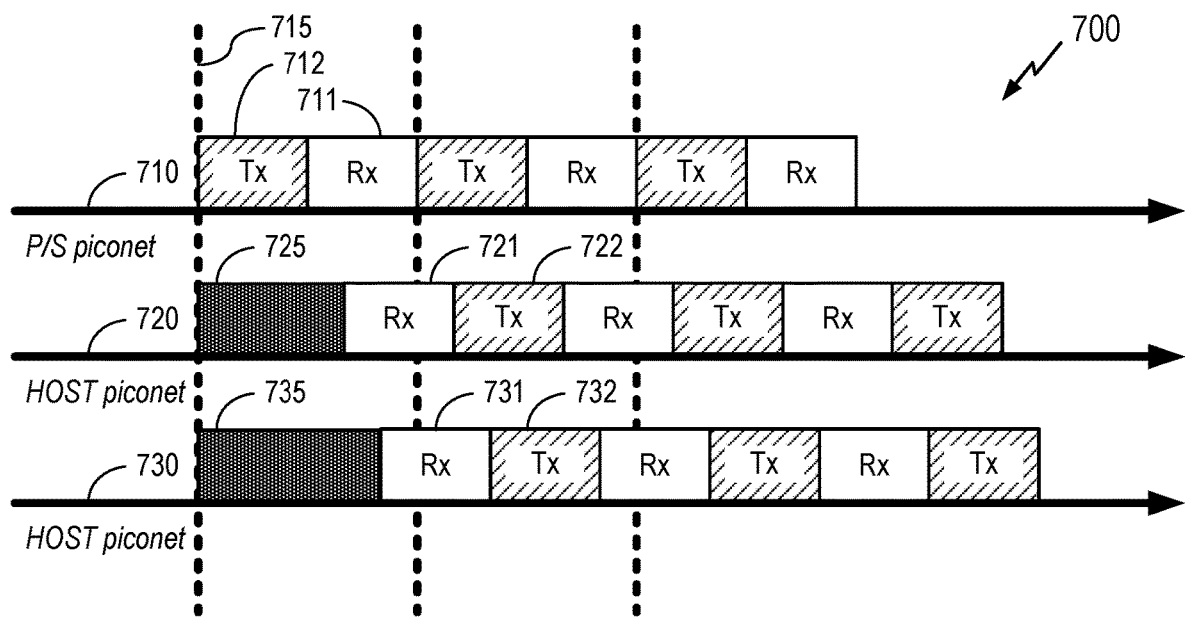
FIG. 7 generally illustrates a timing diagram for a third topology in which the secondary device is the master of the P/S piconet and the primary device is the slave of the host piconet.

FIG. 7 generally illustrates a timing diagram 700 for a third topology in which the secondary device 120 is the master of the P/S piconet 150 and the primary device 110 is the slave of the host piconet 140. Like the timing diagram 500, the timing diagram 700 depicts a relative alignment of the piconet timings of the host piconet 140 and the P/S piconet 150 from the perspective of the secondary device 120. The timing diagram 700 includes a secondary device P/S piconet timeline 710 analogous to the secondary device P/S piconet timeline 510 and a secondary device P/S piconet timeline 720 analogous to the secondary device host piconet timeline 520. Moreover, the secondary device host piconet timeline 710 includes a receiving slot group 711 analogous to the receiving slot group 511, a transmitting slot group 712 analogous to the transmitting slot group 512, and a frame boundary 715 analogous to the frame boundary 515.

The secondary device P/S piconet timeline 720 includes a receiving slot group 721 analogous to the receiving slot group 521, a transmitting slot group 722 analogous to the transmitting slot group 522, and a minimum offset value 725 analogous to the minimum offset value 525. The secondary device P/S piconet timeline 730 includes a receiving slot group 731 analogous to the receiving slot group 531, a transmitting slot group 732 analogous to the transmitting slot group 532, and a maximum offset value 735 analogous to the maximum offset value 535. The transmitting slot group 722 may be used by the secondary device 120 to transmit to the host device 130 if the primary device 110 has designated the secondary device 120 to do so. Otherwise, the transmitting slot group 722 may be used by the primary device 110 to respond to the secondary device 120 if it has received something from the host.

In the scenario of FIG. 5, the primary device 110 is the master of the P/S piconet 150. By contrast, in the scenario of FIG. 7, the secondary device 120 is the master of the P/S piconet 150. Accordingly, in the scenario of FIG. 7, the secondary device 120 may be configured to calculate a slot-offset of the host piconet timing relative to the P/S piconet timing by selecting an offset value that is between the minimum offset value 725 depicted in FIG. 7 and the maximum offset value 735 depicted in FIG. 7. Once the slot-offset is calculated, the secondary device 120 may be further configured to set, adjust, and/or maintain the P/S piconet timing based on the calculated slot-offset. As a result, the secondary device 120 may observe a reception/transmission pattern on the host piconet 140 that is later than the reception/transmission pattern depicted in the secondary device host piconet timeline 720 and earlier than the reception/transmission pattern depicted in the secondary device host piconet timeline 730. The actual values of the minimum offset value 725 and the maximum offset value 735 may be calculated in any suitable manner For example, the minimum offset value 725 may be equal to a duration of a single slot group plus X+Y and the maximum offset value 735 may be equal to a duration of the single frame minus (X+Y), wherein X is an amount of time required for the secondary device 120 to determine whether the primary device 110 is attempting to communicate with the secondary device 120 and Y is a time required by the secondary device 120 to switch between the host piconet 140 and the P/S piconet 150.

Figure 8:
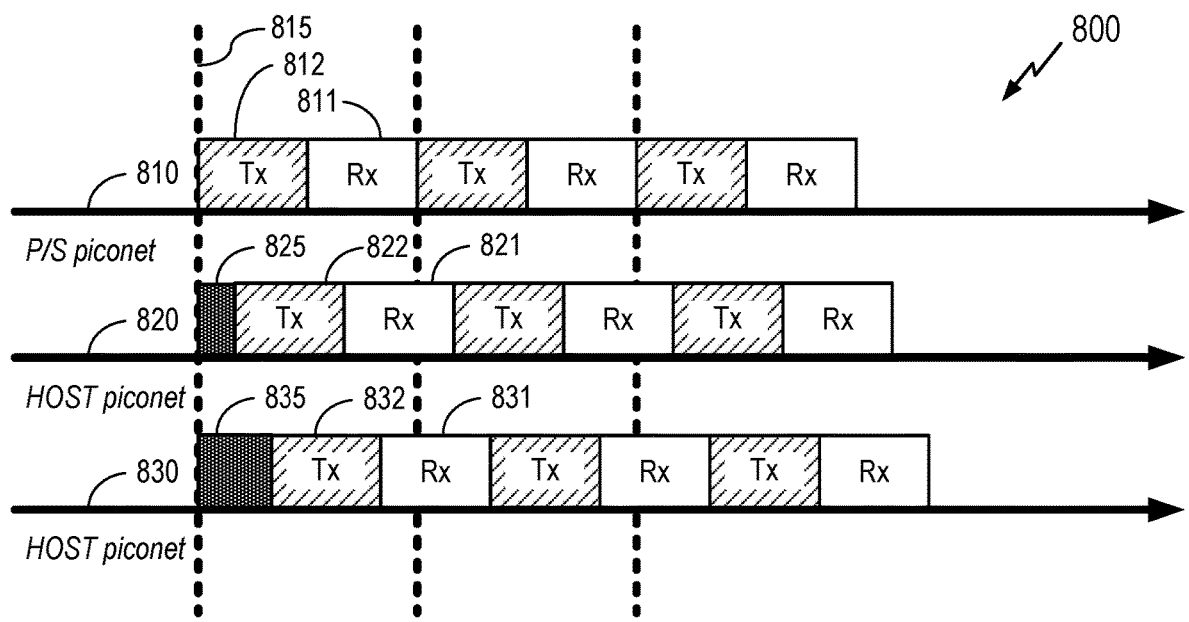
FIG. 8 generally illustrates a timing diagram for a fourth topology in which the secondary device is the master of the P/S piconet 15 and the primary device is the master of the host piconet.

FIG. 8 generally illustrates a timing diagram 800 for a fourth topology in which the secondary device 120 is the master of the P/S piconet 150 and the primary device 110 is the master of the host piconet 140. Like the timing diagrams depicted in FIGS. 5-7, the timing diagram 800 depicts a relative alignment of the piconet timings of the host piconet 140 and the P/S piconet 150 from the perspective of the secondary device 120. The timing diagram 800 includes a secondary device P/S piconet timeline 810 analogous to the secondary device P/S piconet timeline 710 and a secondary device P/S piconet timeline 820 analogous to the secondary device host piconet timeline 720. Moreover, the secondary device host piconet timeline 810 includes a receiving slot group 811 analogous to the receiving slot group 711, a transmitting slot group 812 analogous to the transmitting slot group 712, and a frame boundary 815 analogous to the frame boundary 715.

The secondary device P/S piconet timeline 820 includes a receiving slot group 821 analogous to the receiving slot group 721, a transmitting slot group 822 analogous to the transmitting slot group 722, and a minimum offset value 825 analogous to the minimum offset value 725. The secondary device P/S piconet timeline 830 includes a receiving slot group 831 analogous to the receiving slot group 731, a transmitting slot group 832 analogous to the transmitting slot group 732, and a maximum offset value 835 analogous to the maximum offset value 735. However, unlike in FIG. 7 (corresponding to a scenario in which the primary device 110 is a slave of the host piconet 140), the transmitting slot group 822 and the transmitting slot group 832 precede the receiving slot group 821 and the receiving slot group 831, respectively. The transmitting slot group 822 may belong to the primary device 110 to speak to the host device 130. If a packet is sniffed by the secondary device 120 which is sent by the host device 130, and the secondary device 120 is designated to respond to the host device 130 for this packet, then the secondary device 120 will use the transmitting slot group 822 for transmitting to the host device 130.

Similar to the scenario of FIG. 7, the secondary device 120 in the scenario of FIG. 8 is the master of the P/S piconet 150. Accordingly, the secondary device 120 may be configured to calculate a slot-offset of the host piconet timing relative to the P/S piconet timing by selecting an offset value that is between the minimum offset value 825 depicted in FIG. 8 and the maximum offset value 835 depicted in FIG.

8. Once the slot-offset is calculated, the secondary device 120 may be further configured to set, adjust, and/or maintain the P/S piconet timing based on the calculated slot-offset. As a result, the secondary device 120 may observe a reception/transmission pattern on the host piconet 140 that is later than the reception/transmission pattern depicted in the secondary device host piconet timeline 820 and earlier than the reception/transmission pattern depicted in the secondary device host piconet timeline 830. The actual values of the minimum offset value 825 and the maximum offset value 835 may be calculated in any suitable manner For example, the minimum offset value 825 may be equal to (X+Y) and the maximum offset value 835 may be equal to a duration of a single slot group minus (X+Y), wherein X is an amount of time required for the secondary device 120 to determine whether the primary device 110 is attempting to communicate with the secondary device 120 and Y is a time required by the secondary device 120 to switch between the host piconet 140 and the P/S piconet 150.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on". Moreover, the phrase "coupled to" in electrical contexts encompasses any suitable method for delivering an electrical signal from a first node to a second node. As such, "coupled to" may encompass "coupled directly to" (for example, by direct conductive connection, such as with a copper wire, a solder ball, etc.) as well as "coupled indirectly to" (for example, having one or more intervening structures therebetween, such as a switch, a buffer, a filter, etc.). It will be further understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc. It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first and second elements are consecutive or that the first element precedes the second element in some manner Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code for providing the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method performed by a secondary device, the method comprising:
    listening to a primary device during a receiving slot group of a primary/secondary (P/S) piconet shared between the primary device and the secondary device;

determining based on the listening during the receiving slot group whether the primary device is attempting to communicate with the secondary device;

listening to a host device on a host piconet during a transmitting slot group of the P/S piconet in response to a determination that the primary device is not attempting to communicate with the secondary device; and transmitting to the primary device over the P/S piconet during the transmitting slot group of the P/S piconet in response to a determination that the primary device is attempting to communicate with the secondary device.

2. The method of claim 1, further comprising:

communicating with the primary device to establish the P/S piconet in accordance with a P/S piconet timing, wherein a master of the P/S piconet sets, adjusts, and/or maintains the P/S piconet timing;

wherein the listening to the primary device comprises listening to the primary device in accordance with the established P/S piconet timing.

3. The method of claim 2, further comprising:

receiving from the primary device, over the established P/S piconet, host piconet configuration data relating to the host piconet, wherein the host piconet configuration data comprises:
 a device address of a master of the host piconet;
 a clock offset and a slot offset of the host piconet;
 a maximum packet size for communicating with the host device;
 a packet type table indicating a data rate of the host piconet;
 a channel map indicating frequencies used by the host piconet;
 a preferred data rate indicating an error coding scheme;
 a logical transport address of an asynchronous connection-oriented logical transport, synchronous connection-oriented logical transport, or enhanced synchronous connection-oriented logical transport between the host device and the primary device; or
 any combination thereof;

determining a host piconet timing based on the host piconet configuration data;

wherein the listening to the host device on the host piconet comprises listening to the host device in accordance with the determined host piconet timing.

4. The method of claim 2, wherein:

the primary device is the master of the P/S piconet that sets, adjusts, and/or maintains the P/S piconet timing;
the primary device is a slave of the host piconet; and
a slot-offset of the host piconet timing relative to the P/S piconet timing is:
 greater than (X+Y); and
 less than a duration of a single frame plus Z minus Y;
 wherein X is an amount of time required for the secondary device to determine whether the primary device is attempting to communicate with the secondary device, Y is a time required by the secondary device to switch between the host piconet and the P/S piconet, and Z is a minimum residual time left after transmitting a full-length data packet.

5. The method of claim 2, wherein:

the primary device is the master of the P/S piconet that sets, adjusts, and/or maintains the P/S piconet timing;
the primary device is a master of the host piconet; and
a slot-offset of the host piconet timing relative to the P/S piconet timing is equal to zero.

6. The method of claim 2, wherein:

the secondary device is the master of the P/S piconet that sets, adjusts, and/or maintains the P/S piconet timing;
the primary device is a slave of the host piconet; and
the method further comprises calculating a slot-offset of the host piconet timing relative to the P/S piconet timing and setting, adjusting, and/or maintaining the P/S piconet timing based on the calculated slot-offset, wherein the calculated slot-offset is:
 greater than a duration of a single slot group plus (X+Y); and
 less than a duration of the single frame minus (X+Y);
 wherein X is an amount of time required for the secondary device to determine whether the primary device is attempting to communicate with the secondary device and Y is a time required by the secondary device to switch between the host piconet and the P/S piconet.

7. The method of claim 2, wherein:

the secondary device is the master of the P/S piconet that sets, adjusts, and/or maintains the P/S piconet timing;
the primary device is a master of the host piconet; and
the method further comprises calculating a slot-offset of the host piconet timing relative to the P/S piconet timing and setting, adjusting, and/or maintaining the P/S piconet timing based on the calculated slot-offset, wherein the calculated slot-offset is:
 greater than (X+Y); and
 less than a duration of a single slot group minus (X+Y);
 wherein X is an amount of time required for the secondary device to determine whether the primary device is attempting to communicate with the secondary device and Y is a time required by the secondary device to switch between the host piconet and the P/S piconet.

8. The method of claim 2, wherein the duration of the single slot group is six hundred and twenty-five microseconds and the duration of the single frame is twelve hundred and fifty microseconds.

9. The method of claim 1, further comprising synchronizing with the primary device over the P/S piconet, wherein the synchronizing comprises one or more of the following:

transmitting to or receiving from the primary device a selective relay information signal, wherein the selective relay information signal facilitates identification of one or more missed data packets that were transmitted by the host device and missed by the primary device or the secondary device;

transmitting to or receiving from the primary device (a) one or more missed data packets that were transmitted by the host device and missed by the primary device or the secondary device and/or (b) auxiliary information relating to the one or more missed data packets; and transmitting or receiving an acknowledgement (ACK) indicating that a packet has been received from the primary device or a no-acknowledgement (NACK) indicating that the packet was received with errors.

10. The method of claim 1, further comprising synchronizing with the primary device over the P/S piconet, wherein the synchronizing comprises one or more of the following:

receiving from the primary device updated host piconet configuration data facilitating continued listening to the host device;

transmitting to or receiving from the primary device updated P/S piconet configuration data facilitating continued communication over the P/S piconet;

transmitting to or receiving from the primary device handover information configured to enable the secondary device to switch from a master of the P/S piconet to a slave of the P/S piconet or vice-versa.

11. The method of claim 1, further comprising:
receiving a data packet from the host device;
receiving designation information from the primary device, wherein the designation information indicates that the secondary device is designated to respond to the host device;
transmitting an acknowledgement (ACK) to the host device in response to receiving of the data packet from the host device.

12. The method of claim 1, wherein:
the host device is selected from a group consisting of a set top box, a music player, a video player, an entertainment unit, a navigation device, a personal digital assistant (PDA), a fixed location data unit, a computer, a laptop, a tablet, a communications device, and a mobile phone;
the primary device is a primary audio transceiver configured to transmit a first audio signal associated with a stereo signal;
the secondary device is a secondary audio transceiver configured to transmit a second audio signal associated with the stereo signal.

13. An apparatus, the apparatus comprising a transceiver system, a memory system configured to store data, instructions, or a combination thereof, and a processing system coupled to the transceiver system and the memory system, wherein:
the transceiver system is configured to listen to a primary device during a receiving slot group of a primary/secondary (P/S) piconet shared between the primary device and a secondary device;
the processing system is configured to determine based on the listening during the receiving slot group whether the primary device is attempting to communicate with the secondary device;
the transceiver is further configured to:
listen to a host device on a host piconet during a transmitting slot group of the P/S piconet in response to a determination that the primary device is not attempting to communicate with the secondary device; and
transmit to the primary device over the P/S piconet during the transmitting slot group of the P/S piconet in response to a determination that the primary device is attempting to communicate with the secondary device.

14. The apparatus of claim 13, wherein the transceiver system is further configured to:
communicate with the primary device to establish the P/S piconet in accordance with a P/S piconet timing, wherein a master of the P/S piconet sets, adjusts, and/or maintains the P/S piconet timing;
wherein to listen to the primary device, the transceiver is further configured to listen to the primary device in accordance with the established P/S piconet timing.

15. The apparatus of claim 14, wherein:
the transceiver system is further configured to receive from the primary device, over the established P/S piconet, host piconet configuration data relating to the host piconet, wherein the host piconet configuration data comprises:
a device address of a master of the host piconet;
a clock offset and a slot offset of the host piconet;
a maximum packet size for communicating with the host device;
a packet type table indicating a data rate of the host piconet;
a channel map indicating frequencies used by the host piconet;
a preferred data rate indicating an error coding scheme;
a logical transport address of an asynchronous connection-oriented logical transport, synchronous connection-oriented logical transport, or enhanced synchronous connection-oriented logical transport between the host device and the primary device; or
any combination thereof; and
the processing system is further configured to determine a host piconet timing based on the host piconet configuration data;
wherein to listen to the host device on the host piconet, the transceiver is further configured to listen to the host device in accordance with the determined host piconet timing.

16. The apparatus of claim 14, wherein:
the primary device is the master of the P/S piconet that sets, adjusts, and/or maintains the P/S piconet timing;
the primary device is a slave of the host piconet; and
a slot-offset of the host piconet timing relative to the P/S piconet timing is:
greater than X; and
less than a duration of a single frame plus Z minus Y;
wherein X is an amount of time required for the secondary device to determine whether the primary device is attempting to communicate with the secondary device, Y is a time required by the secondary device to switch between the host piconet and the P/S piconet, and Z is a minimum residual time left after transmitting a full-length data packet.

17. The apparatus of claim 14, wherein:
the primary device is the master of the P/S piconet that sets, adjusts, and/or maintains the P/S piconet timing;
the primary device is a master of the host piconet; and
a slot-offset of the host piconet timing relative to the P/S piconet timing is equal to zero.

18. The apparatus of claim 14, wherein:
the secondary device is the master of the P/S piconet that sets, adjusts, and/or maintains the P/S piconet timing;
the primary device is a slave of the host piconet; and
the processing system is further configured to calculate a slot-offset of the host piconet timing relative to the P/S piconet timing and setting, adjusting, and/or maintaining the P/S piconet timing based on the calculated slot-offset, wherein the calculated slot-offset is:
greater than a duration of a single slot group plus X; and
less than a duration of the single frame minus X;
wherein X is an amount of time required for the secondary device to determine whether the primary device is attempting to communicate with the secondary device.

19. The apparatus of claim 14, wherein:
the secondary device is the master of the P/S piconet that sets, adjusts, and/or maintains the P/S piconet timing;
the primary device is a master of the host piconet; and
the processing system is further configured to calculate a slot-offset of the host piconet timing relative to the P/S piconet timing and setting, adjusting, and/or maintaining the P/S piconet timing based on the calculated slot-offset, wherein the calculated slot-offset is:

greater than X; and
less than a duration of a single slot group minus X;
wherein X is an amount of time required for the secondary device to determine whether the primary device is attempting to communicate with the secondary device.

20. The apparatus of claim 14, wherein the duration of the single slot group is six hundred and twenty-five microseconds and the duration of the single frame is twelve hundred and fifty microseconds.

21. The apparatus of claim 13, wherein the transceiver is further configured to synchronize with the primary device over the P/S piconet, wherein the synchronizing comprises one or more of the following:
transmitting to or receiving from the primary device a selective relay information signal, wherein the selective relay information signal facilitates identification of one or more missed data packets that were transmitted by the host device and missed by the primary device or the secondary device;
transmitting to or receiving from the primary device (a) one or more missed data packets that were transmitted by the host device and missed by the primary device or the secondary device and/or (b) auxiliary information relating to the one or more missed data packets; and
transmitting or receiving an acknowledgement (ACK) indicating that a packet has been received from the primary device or a no-acknowledgement (NACK) indicating that the packet was received with errors.

22. The apparatus of claim 13, wherein the transceiver is further configured to synchronize with the primary device over the P/S piconet, wherein the synchronizing comprises one or more of the following:
receiving from the primary device updated host piconet configuration data facilitating continued listening to the host device;
transmitting to or receiving from the primary device updated P/S piconet configuration data facilitating continued communication over the P/S piconet;
transmitting to or receiving from the primary device handover information configured to enable the secondary device to switch from a master of the P/S piconet to a slave of the P/S piconet or vice-versa.

23. The apparatus of claim 13, wherein the transceiver system is further configured to:
receive a data packet from the host device;
receive designation information from the primary device, wherein the designation information indicates that the secondary device is designated to respond to the host device;
transmit an acknowledgement (ACK) to the host device in response to receiving of the data packet from the host device.

24. The apparatus of claim 13, wherein:
the host device is selected from a group consisting of a set top box, a music player, a video player, an entertainment unit, a navigation device, a personal digital assistant (PDA), a fixed location data unit, a computer, a laptop, a tablet, a communications device, and a mobile phone;
the primary device is a primary audio transceiver configured to transmit a first audio signal associated with a stereo signal;
the secondary device is a secondary audio transceiver configured to transmit a second audio signal associated with the stereo signal.

25. An apparatus, the apparatus comprising:
means for listening to a primary device during a receiving slot group of a primary/secondary (P/S) piconet shared between the primary device and a secondary device;
means for determining based on the listening during the receiving slot group whether the primary device is attempting to communicate with the secondary device;
means for listening to a host device on a host piconet during a transmitting slot group of the P/S piconet in response to a determination that the primary device is not attempting to communicate with the secondary device; and
means for transmitting to the primary device over the P/S piconet during the transmitting slot group of the P/S piconet in response to a determination that the primary device is attempting to communicate with the secondary device.

26. The apparatus of claim 25, wherein:
the primary device is a master of the P/S piconet that sets, adjusts, and/or maintains the P/S piconet timing;
the primary device is a slave of the host piconet; and
a slot-offset of the host piconet timing relative to the P/S piconet timing is:
greater than X; and
less than a duration of a single frame plus Z minus Y;
wherein X is an amount of time required for the secondary device to determine whether the primary device is attempting to communicate with the secondary device, Y is a time required by the secondary device to switch between the host piconet and the P/S piconet, and Z is a minimum residual time left after transmitting a full-length data packet.

27. The apparatus of claim 25, wherein:
the primary device is a master of the P/S piconet that sets, adjusts, and/or maintains the P/S piconet timing;
the primary device is a master of the host piconet; and
a slot-offset of the host piconet timing relative to the P/S piconet timing is equal to zero.

28. A non-transitory computer-readable medium comprising at least one instruction for causing a processor to perform operations, comprising:
code for listening to a primary device during a receiving slot group of a primary/secondary (P/S) piconet shared between the primary device and a secondary device;
code for determining based on the listening during the receiving slot group whether the primary device is attempting to communicate with the secondary device;
code for listening to a host device on a host piconet during a transmitting slot group of the P/S piconet in response to a determination that the primary device is not attempting to communicate with the secondary device; and
code for transmitting to the primary device over the P/S piconet during the transmitting slot group of the P/S piconet in response to a determination that the primary device is attempting to communicate with the secondary device.

29. The non-transitory computer-readable medium of claim 28, wherein:
the primary device is a master of the P/S piconet that sets, adjusts, and/or maintains the P/S piconet timing;
the primary device is a slave of the host piconet; and
a slot-offset of the host piconet timing relative to the P/S piconet timing is:
greater than X; and
less than a duration of a single frame plus Z minus Y;
wherein X is an amount of time required for the secondary device to determine whether the primary device is attempting to communicate with the secondary device, Y is a time required by the secondary device to switch between the host piconet and the P/S piconet, and Z is a minimum residual time left after transmitting a full-length data packet.

30. The non-transitory computer-readable medium of claim 28, wherein:
   the primary device is a master of the P/S piconet that sets, adjusts, and/or maintains the P/S piconet timing;
   the primary device is a master of the host piconet; and
   a slot-offset of the host piconet timing relative to the P/S piconet timing is equal to zero.

\* \* \* \* \*